United States Patent [19]

Takai et al.

[11] Patent Number: 5,126,000
[45] Date of Patent: Jun. 30, 1992

[54] METHOD AND APPARATUS OF MOLDING LAMINATED PLATES

[76] Inventors: Osamu Takai, 5-4, Tamami 2-chome, Asou-ku, Kawasaki-shi, Kanagawa-ken 215; Motohiro Furuya, 12-202, Tsukui 290, Yokosuka-shi, Kanagawa-ken 239, both of Japan

[21] Appl. No.: 445,627

[22] PCT Filed: Mar. 18, 1988

[86] PCT No.: PCT/JP88/00284
§ 371 Date: Jan. 18, 1990
§ 102(e) Date: Jan. 18, 1990

[87] PCT Pub. No.: WO89/08542
PCT Pub. Date: Sep. 21, 1989

[30] Foreign Application Priority Data

Mar. 18, 1988 [WO] World Int. Prop. O. ............ PCT/JP88/00284

[51] Int. Cl.⁵ ............ B29C 65/30; B32B 31/06; H05B 3/34
[52] U.S. Cl. ............ 156/285; 156/382; 219/528; 219/539; 219/549; 428/118
[58] Field of Search ............ 156/285, 286, 382, 499, 156/583.7; 219/482, 528, 549, 539; 264/510; 428/118

[56] References Cited

U.S. PATENT DOCUMENTS

| | | | |
|---|---|---|---|
| 3,438,843 | 4/1969 | Pagel | 219/549 |
| 4,108,713 | 8/1978 | Weisz | 156/499 |
| 4,445,025 | 4/1984 | Metz | 156/583.7 |
| 4,788,417 | 11/1988 | Graflind | 219/528 |

FOREIGN PATENT DOCUMENTS

| | | | |
|---|---|---|---|
| 0456037 | 4/1949 | Canada | 428/118 |
| 0062018 | 4/1983 | Japan | 264/510 |
| 0158451 | 9/1983 | Japan | 219/528 |
| 0009449 | 1/1984 | Japan | 219/528 |

Primary Examiner—Michael W. Ball
Assistant Examiner—Steven D. Maki
Attorney, Agent, or Firm—Sughrue, Mion, Zinn, Macpeak & Seas

[57] ABSTRACT

Disclosed is a method and apparatus of molding laminated plates each comprising a honeycomb core sandwiched between two opposite reinforced resin sheets as skin layers. A molding surface is composed of a plurality of unit area of divisional sections, each having a heating layer embedded therein. A prepreg is used as the reinforced resin layers. The laminated plates are formed by putting the prepreg on a honeycomb material or a honeycomb material on a prepeg, and heating the laminate by a heating layer having nichrome wires. The same procedure is repeated to cover the other side of the honeycomb structure by another reinforced resin layer.

3 Claims, 3 Drawing Sheets

METHOD AND APPARATUS OF MOLDING LAMINATED PLATES

FIELD OF THE INVENTION

The present invention relates to method and apparatus of molding laminated plates, and more particularly to method and apparatus of molding honeycomb-sandwich construction having composite materials as its skin layers and a honeycomb material as its core.

BACKGROUND OF THE INVENTION

Recently, laminated boards have been widely used to build sailing boats, racing cars, airplanes and other vehicles. Particularly, the laminated boards of honeycomb-sandwich construction having a honeycomb material as its core and composite materials as its skin layers are advantageously used because of its light weight and strength.

The molding laminated plate described above is conventionally molded as follows. That is, a honeycomb core is laid on between two composite material sheets to form a honeycomb-sandwich construction, and then the formed honeycomb-sandwich construction is put in an autoclave to be cured by heating under pressure.

This autoclave molding, however, requires a large autoclave whose size is large enough to permit relatively large body parts to be put in the autoclave when building extremely large molding laminated plates such as sailing boats or airplanes. In such a large autoclave it is difficult to make full use of thermal energy, and accordingly the running cost will disadvantageously increase. Still disadvantageously, it is difficult to heat the laminate evenly, and therefore there is a fear of imperfect adhesion between the honeycomb core and the skin layers.

Therefore, an object of the present invention is to solve the foregoing defects as in the prior art described above and provide a method and apparatus of molding laminated plates which method and apparatus of molding laminated plates no matter what a large size they may have, without requiring any autoclave of a large size.

Another object of the present invention is to provide a method and apparatus of molding laminated plates which permit most effective use of heat in almost full response to requirements upon molding the molding laminated plates.

Disclosure of the Invention

A basic feature of the present invention is to divide the molding laminated plates into a plurality of unit areas of divisional sections and then mold these unit areas one after another.

In more detail, the method of molding laminated plates according to the present invention comprises is characterized by preparing a molding surface composed of unit areas of divisional sections each having a heating layer embedded therein, thereby permitting individual heating of each divisional section; putting a reinforced resin sheet on each divisional section, the reinforced resin sheet having substantially the same size and shape as the divisional section; putting on each reinforced resin sheet, a honeycomb plate having substantially the same size and shape as the divisional section; putting an air-tight enclosure on each lamination thus formed; evacuating the air-tight enclosure; and heating the lamination in the vacuum enclosure with the aid of heating layer until the resin material of the reinforced resin sheet has been melted to flow in each cell of the honeycomb structure, thus forming fillets at partition walls of each cell of the honeycomb structure to provide an integrated honeycomb structure laminate when cooled.

It is desired that the method further comprises the step of putting a sheet of an adhesive material on the reinforced resin sheet. The efficiency with which molding is effected can be increased by molding two or more laminated sections simultaneously.

A mold for use in molding unit areas of divisional sections according to the present invention, has a heating layer embedded in each unit area; and a power control connected to each heating layer for permitting individual heating of each divisional section.

Preferably, each heating layer is divided into at least a center area and a surrounding area each equipped with a thermal sensor, and the power control has a first power supply control section and a second power supply control section allotted to the center area and the surrounding area, respectively. Each thermal sensor is responsive to the temperature of associated area for generating an electric signal representing the temperature of the associated area, and the first and second power supply control sections are responsive to the electric signals from the thermal sensors for controlling the supply of electric power to the heating layers so as to keep the center and surrounding areas at the same temperature.

Also, a heating unit for use in molding unit areas of divisional sections each composed of a honeycomb-sandwich construction in accordance with the present invention comprises a flexible heating sheet corresponding to the unit area of divisional section; and power control means for controlling the supply of electric power to the heating sheet.

Preferably, the heating sheet has at least a center area and a surrounding area each equipped with a thermal sensor, and the power control has a first power supply control section and a second power supply control section allotted to the center area and the surrounding area of the heating sheet, respectively. Each thermal sensor is responsive to the temperature of associated area for generating an electric signal representing the temperature of the associated area, and the first and second power supply control sections are responsive to the electric signals from the thermal sensors for controlling the supply of electric power to the heating sheet so as to keep its center and surrounding areas at the same temperature.

BEST MODE OF PRACTICING THE PRESENT INVENTION

Referring to the accompanying drawings, preferred embodiments of the present invention will be described below in detail.

Figure 5:
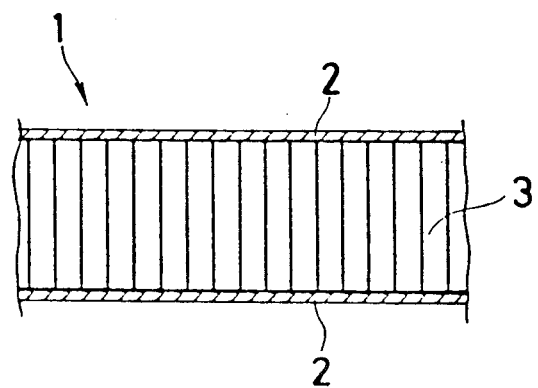
FIG. 5 is a sectional view of a laminated plate.

First, referring to FIG. 5, a honeycomb structure laminate is shown in section, and is indicated at 1. It is shown as comprising a honeycomb core 3 and two reinforced resin sheets 2 laid on the opposite surfaces of the honeycomb core.

The reinforced resin sheet is composed of a resin matrix impregnated with reinforcing fiber such as glass fiber, boron fiber, carbon fiber, silicon carbide fiber, alumina fiber or aromatic fiber. In general, epoxy resin may be used as matrix resin. Another examples of matrix resin are polyimide and polyamideimide. One typical example of such a reinforced resin sheet is prepreg, which is a semi-solid sheet resulting from impregnating woven or parallel-arranged reinforcing fibers with resin and then drying the same.

Figure 1:
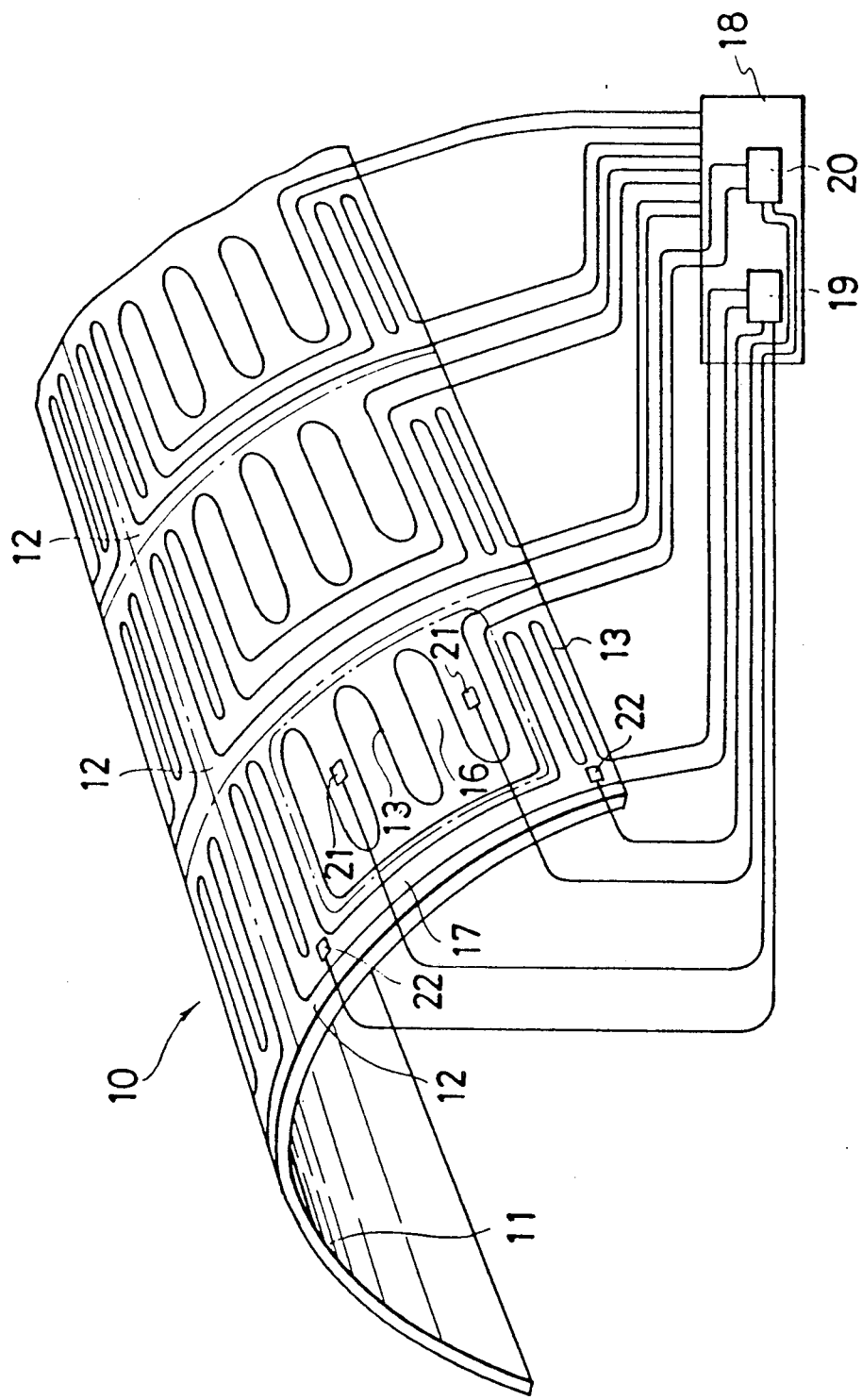
FIG. 1 is a perspective view of a part of a mold surface for molding laminated plates according to one embodiment of the present invention.

FIG. 1 is a perspective view of a part of a mold surface for molding laminated plates according to one embodiment of the present invention. In the drawing the mold surface is indicated at 10.

The molding surface is shown as a male part comprising a body 11 and a plurality of heating layers 12, which can be electrically controlled. Specifically, the molding surface is composed of unit areas of divisional sections each having a heating layer embedded therein, thereby permitting individual heating of each divisional section.

These unit areas of divisional section have a similar structure, and therefore it suffices that one of such unit areas is described in detail.

Figure 2:
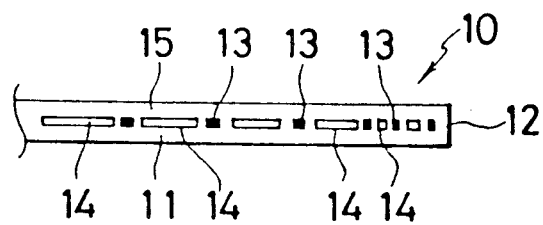
FIG. 2 is a sectional view of a heating layer embedded in the mold surface.

As shown in FIG. 2, a heating layer 12 is formed in the molding surface body 11 by arranging nichrome wires 13 and spacers 14 alternatively at intervals of wire diameter and by pouring melted heat-resistant resin for heat-resistant resin layers 15 over the alternate arrangement of nichrome wires and spaces. Heating elements in the form of ribbon or sheet may be equally used in place of the nichrome wire. The upper surfaces of these heat-resistant resin layers 15 together constitute the molding surface. Each heating layer 12 has a center area 16 and a surrounding area 17.

Each heating layer 12 is connected to a power supply control 18 for controlling the thermal amount of the heating layer. The power supply control 18 comprises a first power supply control section 19 and a second power supply control section 20 allotted to the center heating area 16 and surrounding heating area 17 of the heating layer 12, respectively, to control independently supply of the power to the center heating area 16 and the surrounding heating area 17. The center heating area 16 has thermal sensors 21, and the surrounding heating area 17 has thermal sensors 22. These thermal sensor 21 and 22 are connected to the first and second power supply control sections 19 and 20.

Figure 3:
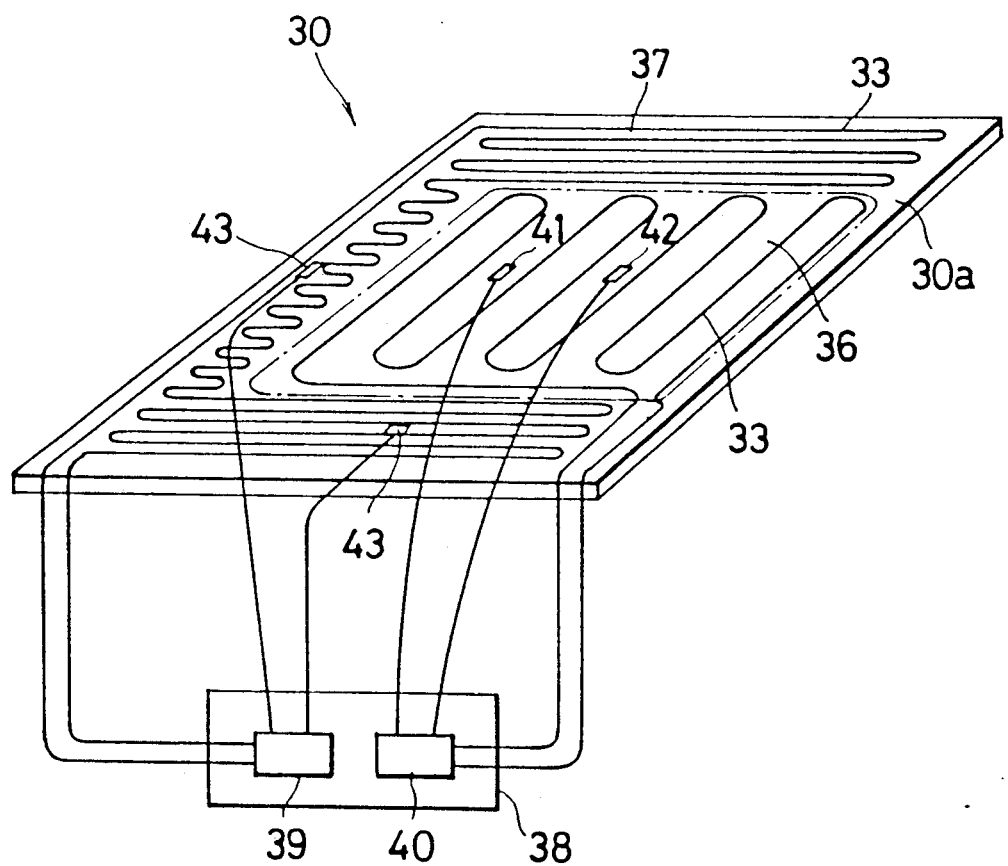
FIG. 3 is a perspective view of a heating unit to be applied to a laminated plate in molding.
Figure 4:
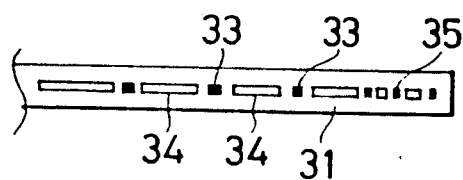
FIG. 4 is a sectional view of a part of the heating unit.

FIG. 3 is a perspective view of a heating unit, which is indicated at 30.

This heating unit 30 corresponds to a heating layer 12 in a unitary area of the molding form 10, and it is flexible enough to permit itself to conform to the curved molding form when laid thereon.

The heating unit 30 is composed of a heating body 30a, comprising a flexible sheet base 31, a plurality of spacers 34, nichrome wire 33 and an overlying heat resistant resin layer 35. The spacer 34 is as thick as nichrome wire diameter, and such spacers 34 and wire 33 are arranged alternately with each other at intervals of nichrome wire diameter. The undersurface of the overlying heat resistant resin layer 35 constitutes a part of counter molding surface. The heating body 30a has center and surrounding areas 36 and 37.

The heating body 30a is connected to a power supply control 38 comprises a first power supply control section 39 and a second power supply control section 40 allotted to the center heating area 36 and surrounding heating area 37 of the heating body 30a, respectively, to control independently supply of the power to the center heating area 36 and the surrounding heating area 37. The center heating area 36 has thermal sensors 41 and 42, and the surrounding heating area 37 has thermal sensors 43. These thermal sensors are connected to the first and second power supply control sections 39 and 40. In short, the heating unit 30 is similar to the heating layer 12 embedded in the unit area of divisional section in structure except that the heating unit is flexible.

Figure 6:
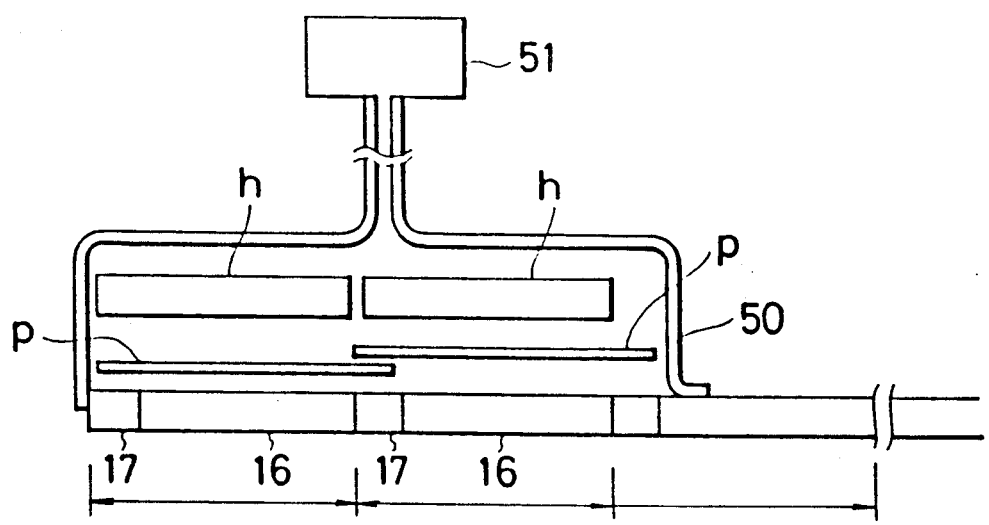
FIG. 6 shows how laminated plates are molded according to the present invention.

Referring to FIG. 6, the method of forming a desired shape of laminated plate according to the present invention is described. In this particular example, two unit areas of divisional sections are formed simultaneously.

First, a predetermined number of sheets of prepreg p are prepared. As seen from the drawing, the sheet of prepreg has a side equal to the side of the unit area plus the lateral size of the surrounding area 17 of the adjacent unit area. Also, the same number of honeycomb plates h are prepared. The honeycomb plate has the same size as the unit area.

As shown in FIG. 6, two sheets of prepreg p and two sheets of honeycomb plates h are laid on selected adjacent unit areas of divisional sections in the order named, and then an air-tight enclosure 50 is put on these layers. The enclosure 50 is connected to an evacuating apparatus 51. An adhesive sheet (not shown) may be laid between the prepreg sheet p and the honeycomb plate h.

Then, the enclosure 50 is evacuated, and the power supply control 18 is operated to the prepreg sheet and honeycomb core according to a predetermined heating program. Ordinarily, the first power supply control section 19 supplies the surrounding heating area 17 with electric power of larger amount than that which the second power supply control section 20 supplies the center heating area 16 with to ensure that the whole area is heated evenly by compensating for the loss of heat radiated to surrounding. The required thermal control is performed in response to the thermal signals from the thermal sensors 21 and 22 in a feedback mode. As a matter of course, the thermal control can be performed manually by an operator while watching the thermal signals on a display device.

When the heating ends, the inside skin 2 and the honeycomb core 3 are adhered together. This is repeated until the whole area of the molding surface 1 has been covered by the inside skin-and-honeycomb core laminate.

Next, likewise, two sheets of prepreg p are laid on the honeycomb core h, and the heating bodies 30a of the two heating units 30 are partly overlapped on each other, and are laid on the sheets of prepreg p. Then, the air-tight enclosure 50 is put on these layers. The enclosure 50 is connected to the evacuating apparatus 51. In the same way as described above, the overlying outer skin 2 and the honeycomb core 3 are heated to adhere the outer skin 2 and the honeycomb core 3 together. This is repeated until the whole area of the molding surface has been covered by the honeycomb structure laminate 1.

Field of Industrial Application

As understood from the above, the laminate molding method according to the present invention is appropriate for forming a relatively large object, such as the body of a sailing boat, racing car, airplane or any other vehicle.

We claim:

1. A method of molding a laminated plate characterized in that it comprises the steps of: preparing a molding surface which is divided into a plurality of unit areas each having a heating layer embedded therein, thereby permitting individual heating of each unit area; putting an inner reinforced resin sheet on one of the unit areas, the reinforced resin sheet having substantially the same size and shape as the unit area; putting on the reinforced resin sheet a honeycomb plate having substantially the same size and shape as the unit area; putting on the honeycomb plate an outer reinforced resin sheet having substantially the same size and shape as the inner reinforced resin sheet to form a lamination having the inner reinforced resin sheet, the honeycomb plate, and the outer reinforced resin sheet; putting an air-tight enclosure on the lamination; evacuating the air-tight enclosure; heating the lamination in the vacuum enclosure with the aid of the heating layer until the resin material of the reinforced resin sheet has been melted to flow in each cell of the honeycomb structure, thus forming fillets at partition walls of each cell of the honeycomb structure to provide an integrated honeycomb structure laminate so that the first section of the laminated plate is formed; and repeating the aforementioned steps to form a section of the laminated plate adjacent to the first section of the laminated plate, whereby the laminated plate is produced in a patchwork manner without use of an autoclave.

2. A method of molding a laminated plate according to claim 1 wherein it further comprises the step of putting sheets of adhesive material between the inner and outer reinforced resin sheets and the honeycomb plate.

3. A method of molding a laminated plate according to claim 1 wherein two or more sections of the laminated plate are molded simultaneously to form said first section of the laminated plate.

* * * * *